March 8, 1938. G. C. ROBBINS 2,110,678
ANIMAL TRAP
Filed March 9, 1936 2 Sheets-Sheet 2

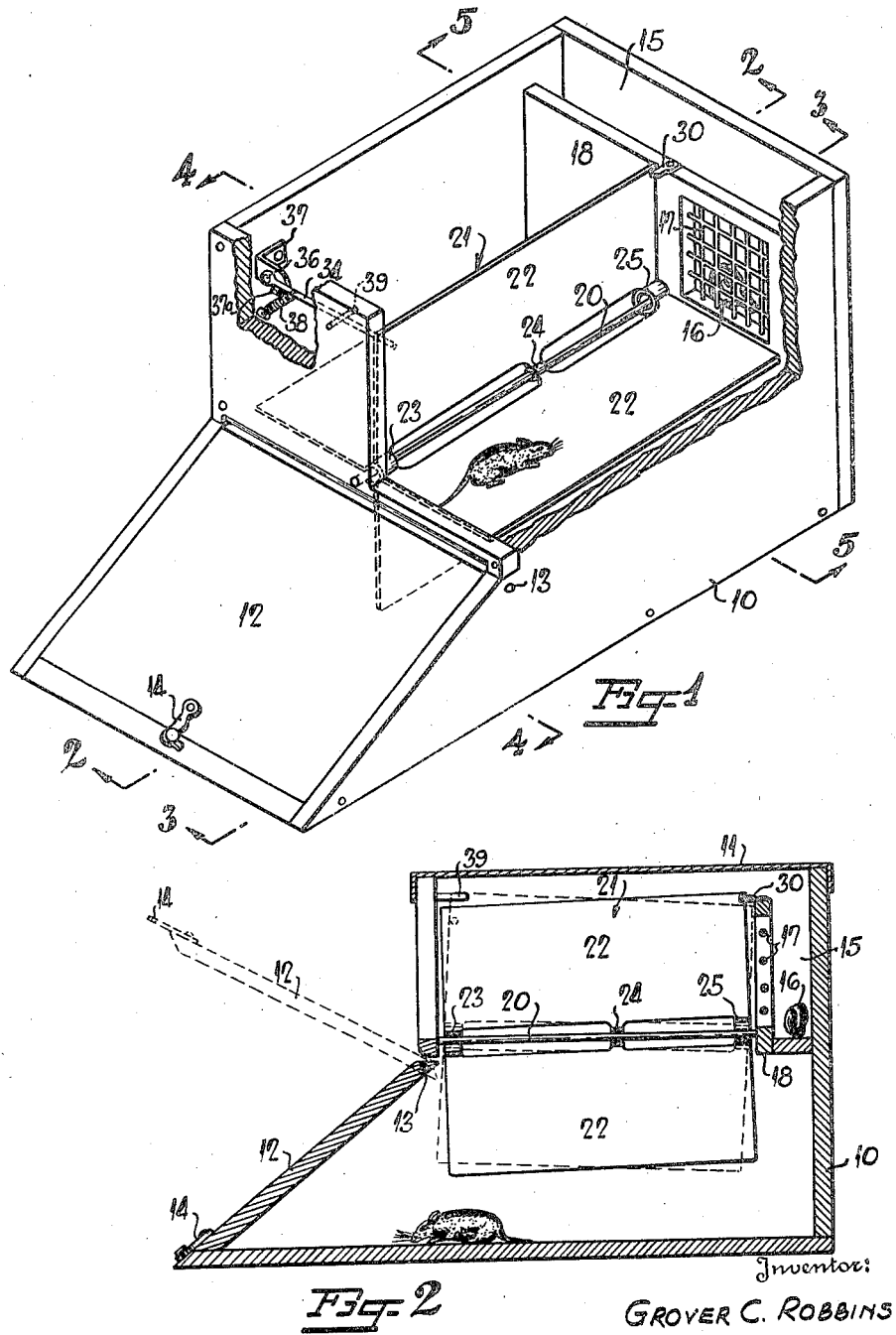

GROVER C. ROBBINS
INVENTOR

By Paul Eaton
Attorney

Patented Mar. 8, 1938

2,110,678

UNITED STATES PATENT OFFICE 2,110,678

ANIMAL TRAP

Grover C. Robbins, Blowing Rock, N. C.

Application March 9, 1936, Serial No. 67,949

2 Claims. (Cl. 43—72)

This invention relates to an animal trap and more especially to a trap wherein a rotary member having vanes is employed for automatically dropping the animal into a closed compartment disposed below the bait as it approaches the bait. This rotary member has a plurality of vanes and is tiltable both axially and radially with means associated therewith for normally holding the member against rotation.

The rotatable member is disposed within the trap so that the path of travel of the animal as it enters into the same in an effort to obtain the lure or bait is longitudinally of the member. When the animal has passed the fulcrum point of the axial suspension of the rotatable member the same is caused to rotate slightly axially which rotation will unlatch the member which is normally held in stationary position and allows radial rotation of the same.

It is, therefore, an object of this invention to provide an animal trap having a rotatable member therein comprising a plurality of vanes which are normally held in stationary position, with means operable by the weight of the animal travelling longitudinally thereof for causing first axial rotation and then radial rotation to allow the animal to fall beneath the vane into the trap. Means are also provided for normally returning and holding the vanes in normal position.

Some of the objects of the invention having been stated, other objects will appear as the description proceeds when taken in connection with the accompanying drawings, in which:—

Figure 1 is an isometric view of an animal trap with the cover removed and portions thereof broken away;

Figure 2 is a longitudinal sectional view taken along line 2—2 in Figure 1;

Figure 4:
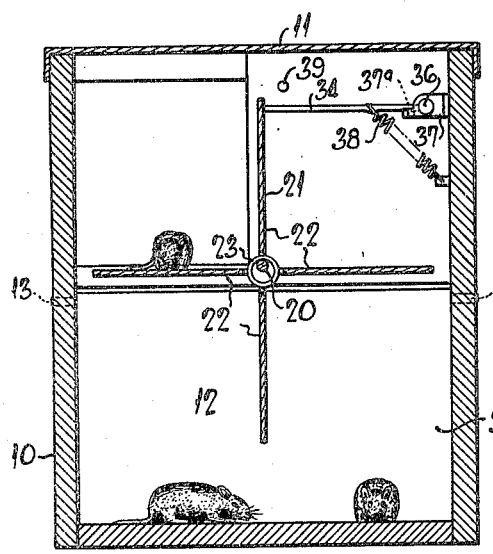
Figure 4 is a transverse sectional view taken along line 4—4 in Figure 1.
Figure 6:
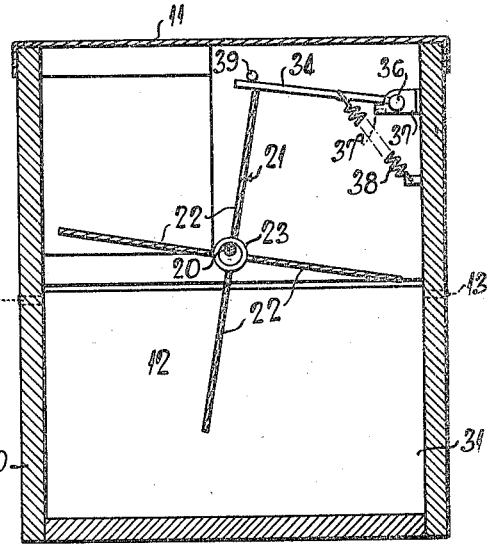
Figure 6 is a transverse sectional view similar to Figure 4 but showing the rotatable member immediately before it returns to normal position.

Referring more specifically to the drawings, the numeral 10 indicates a suitable box in which the trapping mechanism is mounted, which box has a removable cover 11 and a door 12 pivoted as at 13. A latch 14 is also provided for securing this door in closed position. It will be noted that this door 12 also acts as a ramp upon which the animal travels in its attempt to secure the bait within the trap.

A suitable bait compartment 15 is built in the rear portion of the trap which has a bait 16 therein, said bait being shielded by a grill or wire mesh 17 disposed within an opening in the side wall 18. This grill makes the bait 16 inaccessible to an approaching animal but at the same time allows the animal to view and smell the same which will lure him toward it.

Secured longitudinally within the box 10 and near the central portion thereof is a rod 20 upon which is rotatably mounted a member 21 having a plurality of vanes 22. This rotatable member has bearings 23, 24 and 25. The end bearings 23 and 25 are considerably larger than the rod 20 over which they fit, whereas, the central bearing 24 is practically the same size, affording a comparatively tight fit. By providing this set up, it is evident that axial tilting can take place about the central bearing 24. It should further be noted that the central bearing 24 is disposed slightly nearer the right-hand end of bearing 25 than it is to the bearing 23. This will cause the rotatable member to normally assume the position shown in Figures 1 and 2, that is, with the upper interior bearing surface of bearing 23 resting directly upon rod 20 and the lower interior portion of bearing 25 resting against the lower portion of the rod 20.

A suitable stop 30 is secured to the upper portion of side wall 18 against which the top edge of the vanes 22 is adapted to rest when the rotatable member is in a normal position. When the animal travels upon the ramp 12 and upon one of the vanes 22 to the position shown in Figure 1, the rotatable member will not be actuated but when the animal continues his travel and arrives at the position shown in Figure 3 the member 21 will tilt in a counter-clockwise manner about the bearing 24 to the dotted line position shown in Figure 2 or to hold line position shown in Figure 3 at which time the right-hand upper end of the rotatable member will be disposed below the stop 30 and allow the radial rotation of the vanes to cause the animal to fall downwardly into the lower compartment 31. The momentum imparted to the rotatable member caused by the falling of the animal will cause this member to continue to rotate until a vane 21 rides beneath a latch 34 and back to the position shown in Figures 1 and 4 where it is latched in position. This member 34 is pivoted as at 36 to bracket 37, which, in turn, is secured to the interior sidewall of box 10. The bracket 37 has an extension 37a against which the lower portion of the member 34 rests when the parts are in the position shown in Figure 4 and limits the counter-clockwise movement of the same due to the tension exerted by spring 38.

Figure 3:
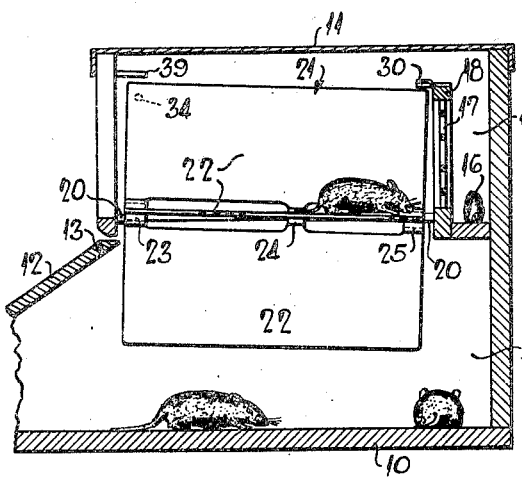
Figure 3 is a longitudinal sectional view with portions broken away and being taken along line 3—3 in Figure 1 but showing the position of the animal and the rotatable member after the same has been unlatched and prior to radial rotation.
Figure 5:
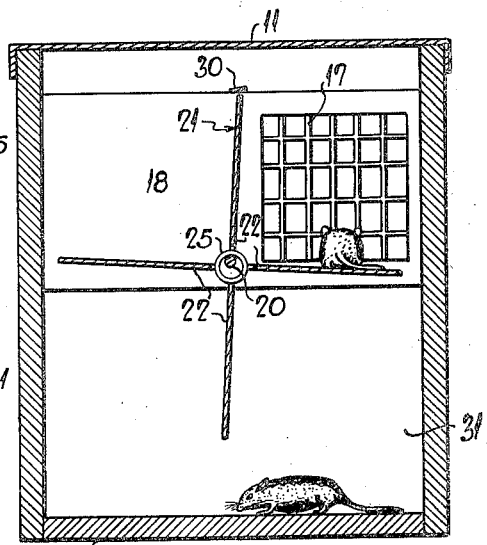
Figure 5 is a transverse sectional view taken along line 5—5 in Figure 1 but showing the rotatable member therein in a position immediately after the axial rotation of the member has been effected by the weight of the animal allowing radial rotation of the member.

After the animal has travelled upon the right-hand end of the rotatable member in Figure 3 and causes the member to be rotated, the uppermost vane 21 rides beneath the pivoted member 34 which exerts a downward pressure on the left-hand end thereof in Figures 2 and 3 so that the right-hand end of the pivoted member will contact the stop 30 immediately after the vane 21 rides from beneath pivoted member 34. A stop member 39 is secured within the interior sidewalls of box 10 to limit the upward movement of the pivoted member 34 and to insure that the pressure exerted by the pivoted member 34 will be sufficient to press the left-hand end of the rotatable member downwardly to the bold line position shown in Figure 2 and to cause the right-hand end thereof to be raised upwardly so that it will contact the stop 30. However, under normal operations, the weight of the left-hand end of the rotatable member would normally cause this tilting to take place but it is evident that there might be certain existing conditions in which this return might not promptly take place and would, therefore, prevent the operation of the trap when the next animal attempts to enter therein.

Spring 38 may be dispensed with if desired, as gravity will operate catch 34.

The lure 16 may be alive and kept in compartment 15 where the decoy or lure can be fed, thus providing means whereby the living lure will not suffer from lack of nourishment.

The lower portion of the box 10 may be water tight and sufficient depth of water may be contained therein to drown the animals as they fall into the lower portion of the trap.

In the drawings and specification there has been set forth a preferred embodiment of the invention and although specific terms are employed, they are used in a generic and descriptive sense only, and not for purposes of limitation, the scope of the invention being set forth in the appended claims.

I claim:

1. An animal trap comprising a box, a rod disposed in said box, a rotatable member having a plurality of vanes, said rotatable member having a bearing portion much larger than the rod at each end of the rotatable member and encircling said rod, said rotatable member having a third bearing portion disposed nearer one end than the other and encircling the said rod, a stop disposed in the path of the outer edge of the vanes when the rotatable member is balanced by its own weight, an arm pivoted at one end and having its free end adapted to fall behind the outer edge of a vane to hold the rotatable member in a fixed position, said box having an entrance in one end thereof whereby an animal can enter onto one of the vanes occupying a horizontal plane so that when the animal moves past the center of the rotatable member the same will tilt and release the same for rotation for a quarter circle at which time the said arm will fall behind the next succeeding vane and the said member will move to balanced position to cause one of its vanes to strike said stop to thereby imprison the animal and to automatically set the trap for another animal.

2. An animal trap comprising a box, a member having a plurality of vanes thereon and being mounted for rotation, means for mounting the member comprising a rod penetrating a tube on which said vanes are fixed, said tube having a restricted bearing intermediate its ends for engaging said rod to allow tilting along the longitudinal axis of the tube, means normally holding the member against rotation, said box having an entrance in one end thereof to permit an animal to enter upon one end of one of the vanes of said member, said box having a bait compartment at the other end of said member so that when the animal approaches the bait compartment the weight of the animal will tilt the member on its longitudinal axis and release the same from the means for holding the member against rotation to allow rotation of the member to discharge the animal into the box below the member and whereby the member will assume normal position and engage the means for preventing rotation of the said member.

GROVER C. ROBBINS.